United States Patent
Wang et al.

(10) Patent No.: US 10,370,276 B2
(45) Date of Patent: Aug. 6, 2019

(54) NEAR-ZERO-RELEASE TREATMENT SYSTEM AND METHOD FOR HIGH CONCENTRATED ORGANIC WASTEWATER

(71) Applicants: XI'AN JIAOTONG UNIVERSITY, Xi'an, Shaanxi (CN); XI'AN WONFU ENERGY AND ENVIRONMENT TECHNOLOGIES CO., LTD., Xi'an, Shaanxi (CN)

(72) Inventors: Shuzhong Wang, Shaanxi (CN); Jianqiao Yang, Shaanxi (CN); Jie Zhang, Shaanxi (CN); Panpan Sun, Shaanxi (CN); Yanhui Li, Shaanxi (CN); Mengmeng Ren, Shaanxi (CN)

(73) Assignees: XI'AN JIAOTONG UNIVERSITY, Xi'an, Shaanxi (CN); XI'AN WONFU ENERGY AND ENVIRONMENT TECHNOLOGIES CO., LTD., Xi'an, Shaanxi (CN)

( * ) Notice: Subject to any disclaimer, the term of this patent is extended or adjusted under 35 U.S.C. 154(b) by 7 days.

(21) Appl. No.: 15/604,652

(22) Filed: May 25, 2017

(65) Prior Publication Data
US 2017/0267565 A1    Sep. 21, 2017

(51) Int. Cl.
*C02F 1/02* (2006.01)
*C02F 1/20* (2006.01)
(Continued)

(52) U.S. Cl.
CPC .............. *C02F 9/00* (2013.01); *C02F 1/004* (2013.01); *C02F 1/02* (2013.01); *C02F 1/20* (2013.01);
(Continued)

(58) Field of Classification Search
CPC .... C02F 1/004; C02F 1/02; C02F 1/20; C02F 1/283; C02F 1/444; C02F 1/727;
(Continued)

(56) References Cited

U.S. PATENT DOCUMENTS

| 5,783,084 A * | 7/1998 | Suenkonis | B01D 1/12 159/47.3 |
| 2005/0279500 A1* | 12/2005 | Heins | C02F 1/04 166/266 |

OTHER PUBLICATIONS

Perry et al., "Perry's Chemical Engineers' Handbook: Seventh Edition" McGraw-Hill, (1997), 18-50 to 18-54 (Year: 1997).*

* cited by examiner

*Primary Examiner* — Lucas A Stelling

(57) ABSTRACT

A near-zero-release treatment system and method for high concentrated organic wastewater is in the chemical engineering and environment protection field, whose core technology is SCWO. The wastewater and sludge are grinded by the homogeneous pump, pressurized by high-pressure plunger pump, transported to successive pipeline for preheating and mixing with the oxygen and undergoes SCWO reaction in the reactor. After pressure release in the pressure relief device, the reacted fluid passes through the self-cleaning filter and gas liquid separator for insoluble solid and gas separation; then enters the MVR for crystallization of the soluble salts to realize near-zero-release of the feeding. The regular water treatment technology (coagulation sedimentation, membrane biotechnology, membrane technology, etc.) is adopted to complement SCWO, which lowers the operating parameters of the reactor and cuts the operating cost by treating the remaining COD with regular water treatment technology.

5 Claims, 1 Drawing Sheet

(51) Int. Cl.
*C02F 1/28* (2006.01)
*C02F 1/44* (2006.01)
*C02F 1/52* (2006.01)
*C02F 1/72* (2006.01)
*C02F 11/08* (2006.01)
*C02F 9/00* (2006.01)
C02F 103/36 (2006.01)
C02F 1/00 (2006.01)

(52) U.S. Cl.
CPC .............. *C02F 1/283* (2013.01); *C02F 1/444* (2013.01); *C02F 1/727* (2013.01); *C02F 11/086* (2013.01); *C02F 2001/5218* (2013.01); *C02F 2103/365* (2013.01); *C02F 2303/26* (2013.01)

(58) Field of Classification Search
CPC ................ C02F 9/00; C02F 2001/5218; C02F 2103/365; C02F 2303/26
See application file for complete search history.

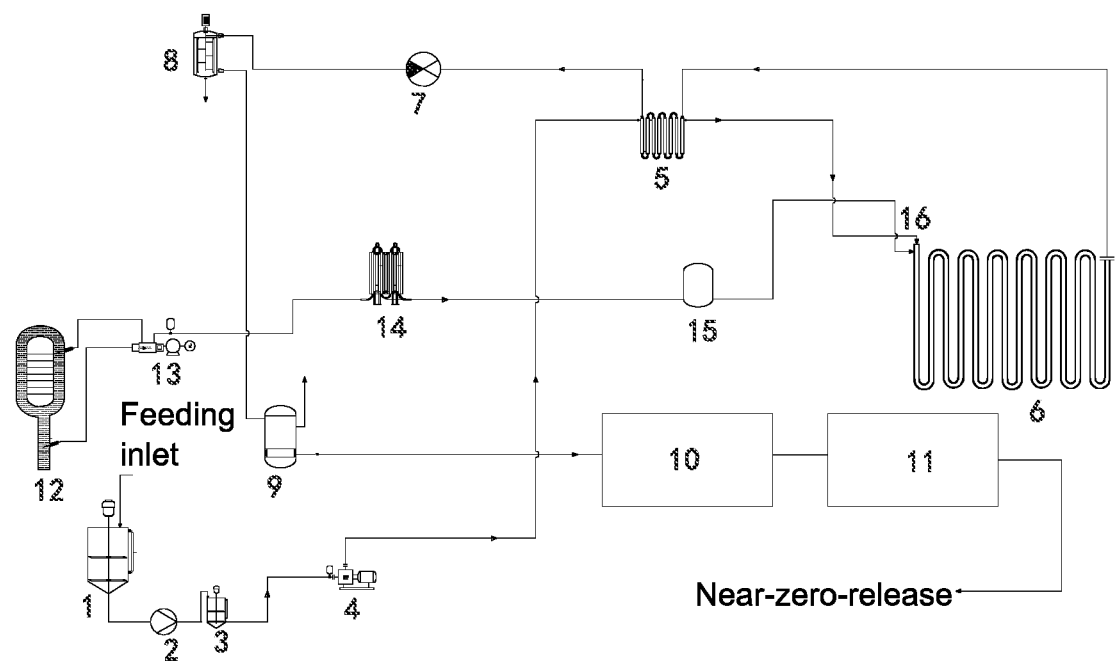

NEAR-ZERO-RELEASE TREATMENT SYSTEM AND METHOD FOR HIGH CONCENTRATED ORGANIC WASTEWATER

BACKGROUND OF THE PRESENT INVENTION

Field of Invention

The present invention relates to chemical engineering and environment protection field, and more particularly to a near-zero-release treatment system and method for high concentrated organic wastewater, the kernel of which is the supercritical water oxidation technology.

Description of Related Arts

Usually, water is in its steam, liquid and ice state. The liquid water is a polar solvent, the density of which is barely changed with the increasing pressure; the liquid water is able to dissolve most electrolytes including salts and is insoluble for gasses and most organic substances. The supercritical water is refers to water with a temperature and a pressure higher than the critical point (374.15° C., 22.1 MPa). The properties of the supercritical water changes significantly that the density, dielectric constant, diffusion coefficient and thermal conductivity is different to the normal water. Besides, the solubility of the organic substances and gases is increased significantly in the supercritical water;

The supercritical water oxidation technology (SCWO) takes the advantage of the special properties of water under supercritical conditions, which makes the oxidizing agent and organic substances fully dissolve in the supercritical water and carry out homogeneous oxidation reaction to rapidly, thoroughly transfers organic substances into harmless small molecule compound such as carbon dioxide, Nitrogen, water and etc. Compared to the complicated conventional treatment technology for biochemical-degradation-resistant organic wastewater, the supercritical water oxidation technology has the following advantages:
1. High-efficiency oxidation, the theoretical removal rate of the organic substances is over 99.9%;
2. Reaction time is shortened; the device is simple structured; the space required is small;
3. When the mass concentration of the organic substances reaches 3%, the system is capable of self-heating.

The supercritical water oxidation technology is applied domestically and abroad. When treating petrochemical sludge, several problems as the following still exist and need to be solved:

Theoretically, SCWO is capable of remove 99.9% of the COD (chemical oxygen demand) in the organic wastewater (sludge). To achieve the desirable result, ideal reaction environment is required, which is high oxidation coefficient (3-10 times), strict reaction conditions (600-700° C., 27-29 MPa), long reaction time (100-150 s). Thus, the requirements for material selection of the piping system, the oxygen supply and the size of the reactor are enhanced, which need extremely high cost. The SCWO technology for treating wastewater needs to be complemented by other wastewater treatment methods for economical reason.

Many easily-coking organic substances exist in the sludge. Adopting the conventional method of preheating the sludge feeding by the heating furnace causes extremely high temperature in the pipes; the organic substances in the water-contained sludge has a high coking tendency on the high temperature wall. If the temperature of the wall is not monitored in time and the wall temperature rises due to coking, overheating tube burst and clogging occur.

When the quantity of the sludge need treating is large, the system process is long. When the entrance temperature of the reactor is insufficient and temperature compensation is needed, if a gas heating furnace is adopted, the heating amount is uncontrollable; if an electric heating furnace is adopted, the heating startup time is long and the thermal inertia is strong, which prevent rapid heating compensation. So, a device capable of controlling heating power and rapidly compensating heat is required.

SCWO process is an exothermic reaction. Research shows that when the mass concentration of the organic substances reaches 3%, the heat released in the reaction is sufficient for preheating the material before entering the reactor. SCWO reaction needs a high temperature, high pressure, high oxygen-containing strong corrosion environment, which requires extremely high standard for material selection for the devices in the system. Nickel-based alloys are usually chosen for making the core devices such as the reactor. The price for nickel-based alloys is high and is not able to be made domestically, which cause high initial investment.

SUMMARY OF THE PRESENT INVENTION

In order to overcome the shortages of the conventional technology, an object of the present invention is to provide a near-zero-release treatment system and method for high concentrated organic wastewater. The present invention is capable of treating the waste materials which fulfills the national standard, effectively recovering the materials, and solving the corrosion and salt deposition problems. The present invention realizes the near-zero-release in an economic way.

The present invention is carried out with the following technical solution:

a near-zero-release process system for high concentrated organic wastewater, comprising: a wastewater transport unit, a reaction unit, an oxygen supplying unit and a reprocessing unit, wherein the wastewater transport unit comprises a sludge tank, a sludge buffer tank, a homogeneous emulsification pump is on a pipe between the sludge tank and the sludge buffer tank; the reaction unit comprises a heat exchanger and a tubular reactor; a high-pressure variable-frequency plunger pump is on a pipe between the sludge buffer tank and the heat exchanger; a outlet of a pipe side of the heat exchanger is connected to an inlet of the tubular reactor; an outlet of the tubular reactor is connected to an inlet of a shell side of the heat exchanger; the oxygen supplying unit is connected to the tubular reactor;

the reprocessing unit comprises a pressure relief device, a self-cleaning filter, a gas liquid separator, a MVR (mechanical vapor recompression) crystallization unit and an advanced treatment unit; an outlet of the shell side of the heat exchanger is connected to an inlet of the pressure relief device; an outlet of the pressure relief device is connected to an inlet of the self-cleaning filter; an outlet of a clean fluid of the self-cleaning filter is connected to the gas liquid separator; an air vent is set on a top of the gas liquid separator; a liquid outlet is set on a bottom of the gas liquid separator; the liquid outlet on the bottom of the gas liquid separator is connected to an inlet of the MVR crystallization unit; an outlet of the MVR crystallization unit is connected to an inlet of the advanced treatment unit;

the oxygen supplying unit comprises a liquid oxygen tank, a low temperature liquid oxygen pump, a liquid oxygen carburetor, a oxygen buffer tank and an oxygen adding mixer; an outlet of the liquid oxygen tank is connected to an inlet of the low temperature liquid oxygen pump; an outlet of the low temperature liquid oxygen pump is connected to a shell side inlet of the liquid oxygen carburetor; a shell side outlet of the liquid oxygen carburetor is connected to an inlet of the oxygen buffer tank; an outlet of the oxygen buffer tank is connected to an inlet of the oxygen adding mixer; the oxygen adding mixer is connected to a gas inlet of the tubular reactor;

the advanced treatment unit (11) adopts activated carbon absorption device, ultrafiltration device or membrane concentration device;

the self-cleaning filter adopts a rotary scraper type self-cleaning filter;

solutes at an entrance of the MVR crystallization unit are sodium chloride, sodium sulfate or sodium carbonate or other soluble salts.

The present invention publics a method for near-zero-release treating of the high concentrated organic wastewater based on the system, comprising the following steps:

1) grinding the organic wastewater and sludge stored inside the sludge tank by the homogeneous emulsification pump until a grain size is smaller than a set value to prevent salt deposition at a set flow velocity; testing the grain size of a grinded water-contained sludge in the sludge buffer tank;

2) pumping the water-contained sludge which is treated in the step (1) into the heat exchanger by the high-pressure variable-frequency plunger pump; the water-contained sludge exchanging heat with a medium at 500° C. and then entering the tubular reactor;

3) an oxygen provided by the oxygen supplying unit homogeneously reacting with an organic substance in wastewater treated in the step 2) under supercritical conditions; the organic substance is decomposed into $CO_2$, $N_2$ and $H_2O$; a reacted high temperature fluid entering the heat exchanger; the fluid exchanging heat with an aqueous medium and being cooled down to 80° C.;

4) reducing a pressure of the high temperature fluid treated in the step 3) in the pressure relief device; discharging insoluble solids through the self-cleaning filter; separating a gas and a liquid through the gas liquid separator; discharging the separated gas to atmosphere; the separated liquid entering the MVR crystallization unit; and 5) removing soluble salts from the high temperature fluid through the MVR crystallization unit; then entering the advanced treatment unit; realizing a near-zero-release of the industrial wastewater and sludge;

in the step 3), the oxygen provided by the oxygen supplying unit is a liquid oxygen from the liquid oxygen tank, which passes through the low temperature liquid oxygen pump, enters the liquid oxygen carburetor to be transformed into gas, enters the oxygen buffer tank and finally enters the tubular reactor;

in the step 3), the supercritical conditions are that a temperature is 560° C. and a pressure is 26 MPa;

in the step 4), exit conditions of the pressure relief device are that a temperature is 80° C. and a pressure is 0.4 MPa; a temperature and a pressure of the self-cleaning filter are set to 80° C. and 0.4 MPa respectively;

a treating capability of the MVR crystallization unit is 2.13 t/h and evaporation is 2 t/h.

Compared with the conventional technology, the present invention has the following benefits:

the present invention publics a near-zero-release treating system for high concentrated organic wastewater and sludge, comprising the wastewater transport unit, the reaction unit, the oxygen supplying unit and the reprocessing unit, wherein the waste water transport unit grinds the wastewater and sludge through the homogeneous emulsification pump until the insoluble solid in the sludge is grinded into set grain size to prevent salt deposition which causes blockage in the subsequent pipeline; the high-pressure variable-frequency plunger pump pressurizes and transports the grinded wastewater into the subsequent pipeline for preheating while mixing with the oxygen from the oxygen supplying unit; the supercritical water oxidation reaction takes place in the tubular reactor of the reaction unit; after the reaction the pressure of the wastewater is relieved by the pressure relief device of the reprocessing unit; the wastewater passes through the self-cleaning filter and the gas liquid separator to separate the insoluble solid and gas; the treated wastewater enters MVR crystallization unit for crystallization treatment of soluble salts to realize the near-zero-release treatment of the feeding. The system of the present invention is capable of effectively separating the heavy metal-contained solid emerged in the SCWO treatment and realizes stable landfill or enables qualified company to safely landfill; the inorganic salts produced by the MVR crystallization are recovered by the glass factory and the sodium sulfate plant; carbon dioxide and nitrogen are mainly generated during the whole treating process, which are able to be released to the atmosphere or collectively recovered. An innovation of the present invention is that an advanced treatment unit in the reprocessing unit is adopted; the liquid at the outlet of the advanced treatment unit reaches the national standard and is able to be released; the advanced treatment unit adopts regular water treatment, such as activated carbon absorption, membrane concentration or membrane biotechnology. The advanced treatment unit is a complement for SCWO technology, which appropriately optimizes the operating parameters of the SCWO reactor and treats the remaining COD with the regular water treatment technology; the operating cost is effectively reduced; the possibility of venting unqualified water is reduced. The present invention adopts SCWO as the kernel technology for wastewater (sludge) treatment system and is capable of near-zero-release of the industrial wastewater and sludge.

The present invention publics a treating method based on the system. The wastewater and sludge treated by the SCWO adopts the self-cleaning filter to remove the insoluble solids in the fluid after reaction; then the insoluble solid is further dehydrated with a pressure filter. A gas liquid separator is adopted to remove the gas in the fluid after reaction; then the treated fluid is crystallized by the MVR. The heavy metal-contained solid emerged in the SCWO treatment is able to be effectively separated through the above separating methods; stable landfill or safely landfill by qualified company are achieved; the inorganic salts produced by the MVR crystallization are recovered by the glass factory and the sodium sulfate plant; carbon dioxide and nitrogen are mainly generated during the whole treating process, which are able to be released to the atmosphere or collectively recovered. The wastewater (sludge) treatment system which adopts SCWO as the kernel technology is capable of near-zero-release treatment of industrial wastewater and sludge.

BRIEF DESCRIPTION OF THE DRAWINGS

FIG. 1 is a perspective view of a near-zero-release treatment system for a high concentrated organic wastewater and sludge.

ELEMENT NUMBER

1—sludge tank; 2—homogeneous emulsification pump; 3—sludge buffer tank; 4—high-pressure variable-frequency plunger pump; 5—heat exchanger; 6—tubular reactor; 7—pressure relief device; 8—self-cleaning filter; 9—gas liquid separator; 10—MVR crystallization unit; 11—advanced treatment unit; 12—liquid oxygen tank; 13—low temperature liquid oxygen pump; 14—liquid oxygen carburetor; 15—oxygen buffer tank; 16—oxygen adding mixer.

DETAILED DESCRIPTION OF THE PREFERRED EMBODIMENT

Referring to FIG. 1 of the drawings, according to a preferred embodiment of the present invention is illustrated. The embodiment is an explanation not a limitation of the present invention, wherein a near-zero-release process system for high concentrated organic wastewater, comprising: a wastewater transport unit, a reaction unit, an oxygen supplying unit and a reprocessing unit, wherein the wastewater transport unit comprises a sludge tank 1, a sludge buffer tank 3, a homogeneous emulsification pump 2 is on a pipe between the sludge tank 1 and the sludge buffer tank 3; the reaction unit comprises a heat exchanger 5 and a tubular reactor 6; a high-pressure variable-frequency plunger pump 4 is on a pipe between the sludge buffer tank 3 and the heat exchanger 5; a outlet of a pipe side of the heat exchanger 5 is connected to an inlet of the tubular reactor 6; an outlet of the tubular reactor 6 is connected to an inlet of a shell side of the heat exchanger 5; the oxygen supplying unit is connected to the tubular reactor 6;

the reprocessing unit comprises a pressure relief device 7, a self-cleaning filter 8, a gas liquid separator 9 and a MVR (mechanical vapor recompression) crystallization unit 10; an outlet of the shell side of the heat exchanger 5 is connected to an inlet of the pressure relief device 7; an outlet of the pressure relief device 7 is connected to an inlet of the self-cleaning filter 8; an outlet of a clean fluid of the self-cleaning filter 8 is connected to the gas liquid separator 9; an air vent is set on a top of the gas liquid separator 9; a liquid outlet is set on a bottom of the gas liquid separator 9; the liquid outlet on the bottom of the gas liquid separator 9 is connected to an inlet of the MVR crystallization unit 10; the reprocessing unit further comprises a advanced treatment unit 11; an outlet of the MVR crystallization unit 10 is connected to an inlet of the advanced treatment unit 11;

the oxygen supplying unit comprises a liquid oxygen tank 12, a low temperature liquid oxygen pump 13, a liquid oxygen carburetor 14, a oxygen buffer tank 15 and an oxygen adding mixer 16; an outlet of the liquid oxygen tank 12 is connected to an inlet of the low temperature liquid oxygen pump 13; an outlet of the low temperature liquid oxygen pump is connected to a shell side inlet of the liquid oxygen carburetor 14; a shell side outlet of the liquid oxygen carburetor 14 is connected to an inlet of the oxygen buffer tank 15; an outlet of the oxygen buffer tank 15 is connected to an inlet of the oxygen adding mixer 16; the oxygen adding mixer 16 is connected to a gas inlet of the tubular reactor 6;

solutes at an entrance of the MVR crystallization unit 10 are sodium chloride, sodium sulfate or sodium carbonate;

the self-cleaning filter 8 adopts a rotary scraper type self-cleaning filter; the filter fineness is extremely high; the filter is capable of continuously-running under pressure and filtering out the insoluble solids in the water;

the advanced treatment unit 11 adopts regular water treatment technology such as activated carbon absorption, ultrafiltration or membrane concentration technology; the remaining COD (chemical oxygen demand) after supercritical water oxygen reaction is removed by the advanced treatment unit which lowers the required temperature and pressure parameters of the supercritical water oxygen reaction and cuts the cost by compromising the material quality and reducing the operating temperature.

The present invention publics a method for near-zero-release treating of the high concentrated organic wastewater based on the system, comprising the following steps:

1) grinding the organic wastewater and sludge stored inside the sludge tank by the homogeneous emulsification pump until a grain size is smaller than a set value; testing the grain size of a grinded water-contained sludge in the sludge buffer tank;

2) pumping the water-contained sludge which is treated in the step (1) into the heat exchanger by the high-pressure variable-frequency plunger pump; the water-contained sludge exchanging heat with a medium at 500° C. and then entering the tubular reactor;

3) oxygen provided by the oxygen supplying unit homogeneously reacting with an organic substance in wastewater treated in the step 2) under supercritical conditions; the organic substance is decomposed into $CO_2$, $N_2$ and $H_2O$; a reacted high temperature fluid entering the heat exchanger; the fluid exchanging heat with an aqueous medium and being cooled down to 80° C.;

4) reducing a pressure of the high temperature fluid treated in the step 3) in the pressure relief device; discharging insoluble solids through the self-cleaning filter; separating a gas and a liquid through the gas liquid separator; discharging the separated gas to atmosphere; the separated liquid entering the MVR crystallization unit; and 5) removing soluble salts from the high temperature fluid through the MVR crystallization unit; entering the advanced treatment unit; realizing a near-zero-release of the industrial wastewater and sludge.

The working principle of the above system and method is as below:

(1) the organic wastewater and sludge is stored in the sludge tank 1 and is grinded to a set grain size by the homogeneous emulsification pump 2; the insoluble solid sludge particles smaller than the set value flows at a set flow velocity without deposition in the pipelines of the system, which ensures a smooth flow at a regular flow velocity; the grinded water-contained sludge enters the sludge buffer tank 3 for further grain size test; then the water-contained sludge passes through the high-pressure variable-frequency plunger pump 4 and enters the heat exchanger 5; the cold sludge exchanges heat with a medium whose inlet temperature is 500° C.; then the sludge enters the tubular reactor 6; the liquid oxygen from the liquid oxygen tank 12 passes through the low temperature liquid oxygen pump 13, enters the liquid oxygen carburetor 14 to be transformed into gas, enters the oxygen buffer tank 15 and finally enters the tubular reactor 6 to mix and react with the organic wastewater;

(2) the oxygen and the organic substances in the wastewater homogeneously react in the tubular reactor 6 under the supercritical conditions (560° C., 26 MPa); the organic substances is oxidized and decomposed rapidly and thoroughly into $CO_2$, $N_2$ and $H_2O$; the reacted high temperature fluid enters the heat exchanger and is cooled down to 80° C.; the cooling method is heat exchange with the medium water; then the fluid enters the pressure relief device to reduce the pressure; the exit condition of the pressure relief device 7 is (80° C., 0.4 MPa);

(3) the reacted fluid passes through the self-cleaning filter 8 (80° C., 0.4 MPa) which separates and discharges the insoluble solids; the fluid enters the gas liquid separator 9 for gas liquid separation; the separated gas comprises mainly $CO_2$ and $N_2$ which are able to be discharged to atmosphere; the separated liquid enters the MVR crystallization unit 10; the treating capability of the MVR crystallization unit 10 is 2.13 t/h and the evaporation is 2 t/h; the system is capable of continuously feeding; the soluble salts (mainly are sodium chloride, sodium sulfate or sodium carbonate) are separated through evaporation and crystallization; the fluid enters the advanced treatment unit 11 which is for further treating of the remaining organic substances after the SCWO; the advanced treatment unit 11 is a regular water treatment device adopts activated carbon absorption, membrane biotechnology or membrane technology.

What is claimed is:

1. A near-zero-release process system for high concentrated organic wastewater, comprising: a wastewater transport unit, a reaction unit, an oxygen supplying unit and a reprocessing unit, wherein the wastewater transport unit comprises a sludge tank (1) and a sludge buffer tank (3), wherein a homogeneous emulsification pump (2) is on a pipe between the sludge tank (1) and the sludge buffer tank (3); the reaction unit comprises a heat exchanger (5) and a tubular reactor (6); a high-pressure variable-frequency plunger pump (4) is on a pipe between the sludge buffer tank (3) and the heat exchanger (5); an outlet of a pipe side of the heat exchanger (5) is connected to an inlet of the tubular reactor (6); an outlet of the tubular reactor (6) is connected to an inlet of a shell side of the heat exchanger (5); the oxygen supplying unit is connected to the tubular reactor (6);

the reprocessing unit comprises a pressure relief device (7), a self-cleaning filter (8), a gas liquid separator (9), a MVR (mechanical vapor recompression) crystallization unit (10) and an advanced treatment unit (11); wherein an outlet of the shell side of the heat exchanger (5) is connected to an inlet of the pressure relief device (7); an outlet of the pressure relief device (7) is connected to an inlet of the self-cleaning filter (8); an outlet of a clean fluid of the self-cleaning filter (8) is connected to the gas liquid separator (9); an air vent is set on a top of the gas liquid separator (9); a liquid outlet is set on a bottom of the gas liquid separator (9); the liquid outlet on the bottom of the gas liquid separator (9) is connected to an inlet of the MVR crystallization unit (10); an outlet of the MVR crystallization unit (10) is connected to an inlet of the advanced treatment unit.

2. The near-zero-release process system for the high concentrated organic wastewater, as recited in claim 1, wherein the oxygen supplying unit comprises a liquid oxygen tank (12), a low temperature liquid oxygen pump (13), a liquid oxygen carburetor (14), an oxygen buffer tank (15) and an oxygen adding mixer (16); wherein an outlet of the liquid oxygen tank (12) is connected to an inlet of the low temperature liquid oxygen pump (13); an outlet of the low temperature liquid oxygen pump (13) is connected to a shell side inlet of the liquid oxygen carburetor (14); a shell side outlet of the liquid oxygen carburetor (14) is connected to an inlet of the oxygen buffer tank (15); an outlet of the oxygen buffer tank (15) is connected to an inlet of the oxygen adding mixer (16); the oxygen adding mixer (16) is connected to a gas inlet of the tubular reactor (6).

3. The near-zero-release process system for the high concentrated organic wastewater, as recited in claim 1, wherein the advanced treatment unit (11) adopts an activated carbon absorption device, an ultrafiltration device or a membrane concentration device.

4. The near-zero-release process system for the high concentrated organic wastewater, as recited in claim 1, wherein the self-cleaning filter (8) adopts a rotary scraper type self-cleaning filter.

5. The near-zero-release process system for the high concentrated organic wastewater, as recited in claim 1, wherein solutes at an entrance of the MVR crystallization unit (10) are sodium chloride, sodium sulfate or sodium carbonate.

* * * * *